Jan. 14, 1969  L. J. A. LAMMERS  3,421,627
BYPASS FILTER WITH MAGNETIC MEMBER
Filed Aug. 30, 1965
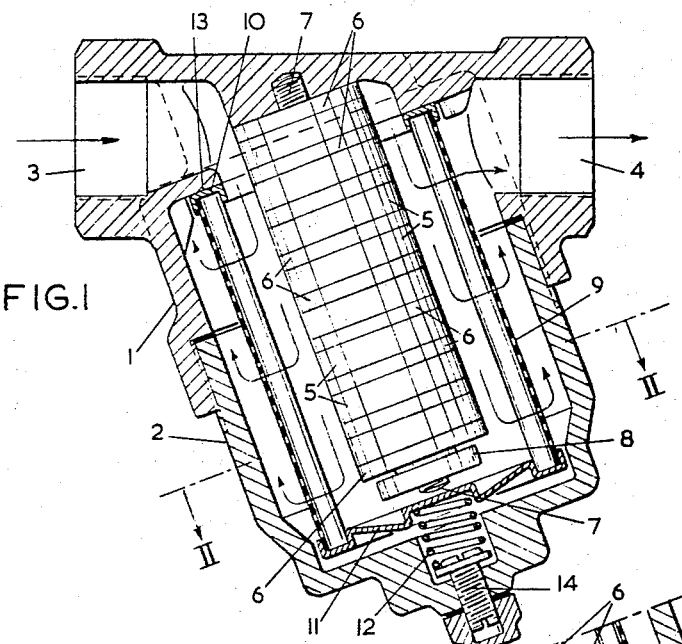
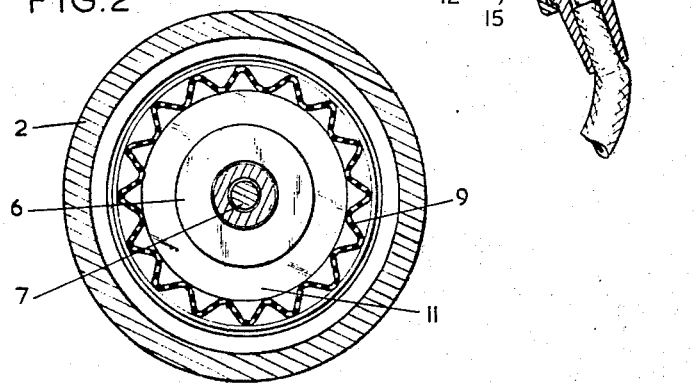
INVENTOR
LAMBERTUS J. A. LAMMERS
BY
ATTORNEYS

United States Patent Office 3,421,627
Patented Jan. 14, 1969

3,421,627
BYPASS FILTER WITH MAGNETIC MEMBER
Lambertus J. A. Lammers, Arnhem, Netherlands, assignor to Arlon N.V., Arnhem, Netherlands, a company of the Netherlands
Filed Aug. 30, 1965, Ser. No. 483,541
Claims priority, application Netherlands, Oct. 9, 1964, 6411743
U.S. Cl. 210—131      1 Claim
Int. Cl. B01d *35/06*

ABSTRACT OF THE DISCLOSURE

A fluid filter in which the filter element is constructed and arranged to move and permit fluid to bypass the element when clogging of the element occurs. The filter has a magnetic member located centrally within the filter element in such a position to contact and remove magnetic particles from the fluid even under bypass conditions.

---

The invention relates to a filter provided with a casing having an inlet for the liquid to be cleaned and an outlet for the filtered liquid and a sleeve of perforated material in said casing leaving a space at the circumferencial wall of the casing, the outlet of the casing communicating with said space.

The invention has for its object to provide simple means at a filter of this kind whereby on a too large resistance due to deposit of impurities at the perforated wall of the sleeve a bypass for the liquid to be cleaned is opened, and still the filter action at least partly is maintained. According to the invention the inlet of the casing communicates with the open end of the sleeve and said sleeve being axially slidable in the casing and a spring pressing against the bottom of the sleeve in order to urge the sleeve with its open end tightly on a supporting face in the casing, and one or more permanent magnetic bodies extend into the sleeve at the open end thereof. With the position of the sleeve with its open end on the face of the casing all liquid entering the sleeve through the inlet has to pass through the perforated wall thereof until the resistance has increased due to deposit of impurities on the wall of the sleeve to such an extent and therefore the liquid pressure in the sleeve has become so high that the pressure exerted on the bottom of the sleeve exceeds the pressure of the spring. Thereby the sleeve at its open end is freed from the supporting face in the casing and the liquid may flow directly from the inlet to the outlet, but the filter action of the magnetic body or bodies will at least partly be maintained as the liquid flows along said body at the open end of the sleeve.

In the accompanying drawing showing an example of the filter according to the invention:

FIG. 1 is a sectional elevation of the filter.

FIG. 2 is a cross section of the filter taken on line II—II in FIG. 1.

FIG. 3 is a somewhat modified embodiment provided with means for producing a signal when upon increasing the resistance in the filter the perforated sleeve is axially displaced.

The casing of the filter consists of two parts, viz an upper part 1 having an inlet 3 and an outlet 4, and a lower part 2 threaded by screw thread in inner thread at the upper part. The magnetic body is placed centrally in the casing and consists of discs 5 of magnetic material and terminal discs and intermediate discs 6 of nonmagnetic material. The system of said discs 5 and 6 is clamped on a central bolt 7 by a nut 8.

The magnetic body 5, 6 is surrounded by a sleeve 9 of perforated material having longitudinal corrugations and being engaged at its upper end in a ring 10 of U-shaped section. The sleeve 9 at its lower end is closed by a bottom 11 and at its upper end the sleeve with the ring 10 is tightly urged on the supporting face 13 in the casing by the pressure of a spring 12. When the filter is in normal operation the sleeve with its ring 10 is forced on the supporting face 13 in the casing and the liquid entering at 3 flows into the sleeve and passes through the perforations in the wall of the sleeve in order to leave the casing through the outlet 4 as indicated by the arrows in FIG. 1. If by deposit of impurities on the wall of the sleeve the resistance in the filter increases and thereby the pressure in the sleeve will be higher, the sleeve 9 will be moved downwards in dependence of the pressure exerted by spring 12. The sleeve 9 will now leave a slot of the supporting face 13 so that the liquid will bypass the circumferencial wall of the sleeve and may flow directly to the outlet 4. At the upper portion of the magnetic body, however, on which impurities are deposited still a certain filter action will take place.

The pressure exerted by spring 12 may be varied by means of an adjusting screw 14.

The axial displacement of the sleeve 9 by the increased pressure in the sleeve may be used for producing a light signal or an acoustic signal as warning when impurities are accumulated in the filter. To this end according to FIG. 3 a pin 15 is secured at the bottom 11 of the sleeve and said pin can close a contact 16.

It is to be noted that the invention is not limited to the above described embodiment shown in the drawing as various modifications may be made. It is thus possible to provide in the perforated sleeve 9 two or more magnetic bodies. Further it is not necessary to arrange the outlet 4 opposite to the inlet 3, as the outlet may be located at any suitable place at the wall of the casing. The casing may also be provided with a removable cover at its upper end for easily removing the sleeve 9 and the magnetic body.

What I claim is:

1. A filter comprising a casing having a cylindrical well therein and an annular shoulder above the open end of and facing said well in alignment therewith, said casing having an inlet passage opening directly within the compass of said annular shoulder, said casing also having an outlet passage in communication with said well and adjacent said annular shoulder, said passages being sufficiently in line so that liquid flowing from said inlet passage directly to said outlet passage must flow across said shoulder, a sleeve of filter material in said well and defining an annular space therebetween, said sleeve having an open upper end and an imperforate bottom wall member at its lower end, spring means acting between the bottom of said well and said imperforate bottom wall normally to sealingly seat the upper edge of said sleeve against said annular shoulder but upon clogging of said sleeve to permit unseating of the upper end thereof to allow substantially straight through flow of liquid between said inlet and outlet passages, and a magnetic filter member carried by said casing within the compass of said annular shoulder, said magnetic filter member being disposed within the path of straight through liquid flow and extending from a point above said shoulder concentrically of and substantially to the lower end of said sleeve, whereby liquid passing between said inlet and outlet passages always will impinge upon said magnetic filter member regardless of whether said liquid passes through said sleeve or directly between said passages.

(References on following page)

References Cited

UNITED STATES PATENTS

| | | | |
|---|---|---|---|
| 1,335,955 | 4/1920 | Cox | 210—222 X |
| 2,387,368 | 10/1945 | Vokes | 210—131 |
| 2,583,522 | 1/1952 | Winslow et al. | 210—223 |
| 2,795,333 | 6/1957 | Kennedy | 210—223 |
| 2,937,754 | 5/1960 | Kasten | 210—131 |
| 3,106,527 | 10/1963 | Korte et al. | 210—223 |
| 3,224,583 | 12/1965 | Rosaen | 210—131 X |

SAMIH N. ZAHARNA, *Primary Examiner.*

W. S. BRADBURY, *Assistant Examiner.*

U.S. Cl. X.R.

210—223